Sept. 22, 1959  R. E. SEARS  2,905,008
MEANS FOR PRELOADING A BALL SPLINE ASSEMBLY
Filed Oct. 6, 1958  2 Sheets-Sheet 2

INVENTOR.
RICHARD E. SEARS
BY
Barnes, Kisselle, Raisch & Choate
ATTORNEYS

United States Patent Office 2,905,008
Patented Sept. 22, 1959

2,905,008

MEANS FOR PRELOADING A BALL SPLINE ASSEMBLY

Richard E. Sears, Birmingham, Mich., assignor to Beaver Precision Products, Inc., Clawson, Mich., a corporation of Michigan Application October 6, 1958, Serial No. 765,587

23 Claims. (Cl. 74—409)

This invention relates to ball splines and more particularly to a means for preloading a ball spline assembly so as to eliminate back-lash therein.

A spline assembly wherein two members are secured together for rotation as a unit and relative translatory movement by means of balls interposed between axially extending grooves in the two members is commonly referred to as a ball spline. The use of ball splines is admirably adapted where a minimum of friction is desired with respect to the relative translatory movement of the members. In the field of machine tools, ball splines have wide applications. For example, in the case of a vertical milling machine or a boring machine, ball splines provide an ideal rotary drive for a vertically movable head. However, in a ball spline of conventional design, a small amount of back-lash is present; and in many applications, such back-lash is not only undesirable, but actually intolerable.

It is an object of this invention to provide a novel means for preloading a ball spline so as to eliminate all back-lash therein.

A further object of the invention resides in the provision of a novel ball spline arrangement involving the use of two spline guides on a spline shaft in combination with means for preloading the guides circumferentially in opposite directions.

A further object of the invention resides in the provision of a means for preloading a ball spline of the gear driven type which at the same time serves to eliminate back-lash in the gear drive to the spline shaft.

Figure 1:
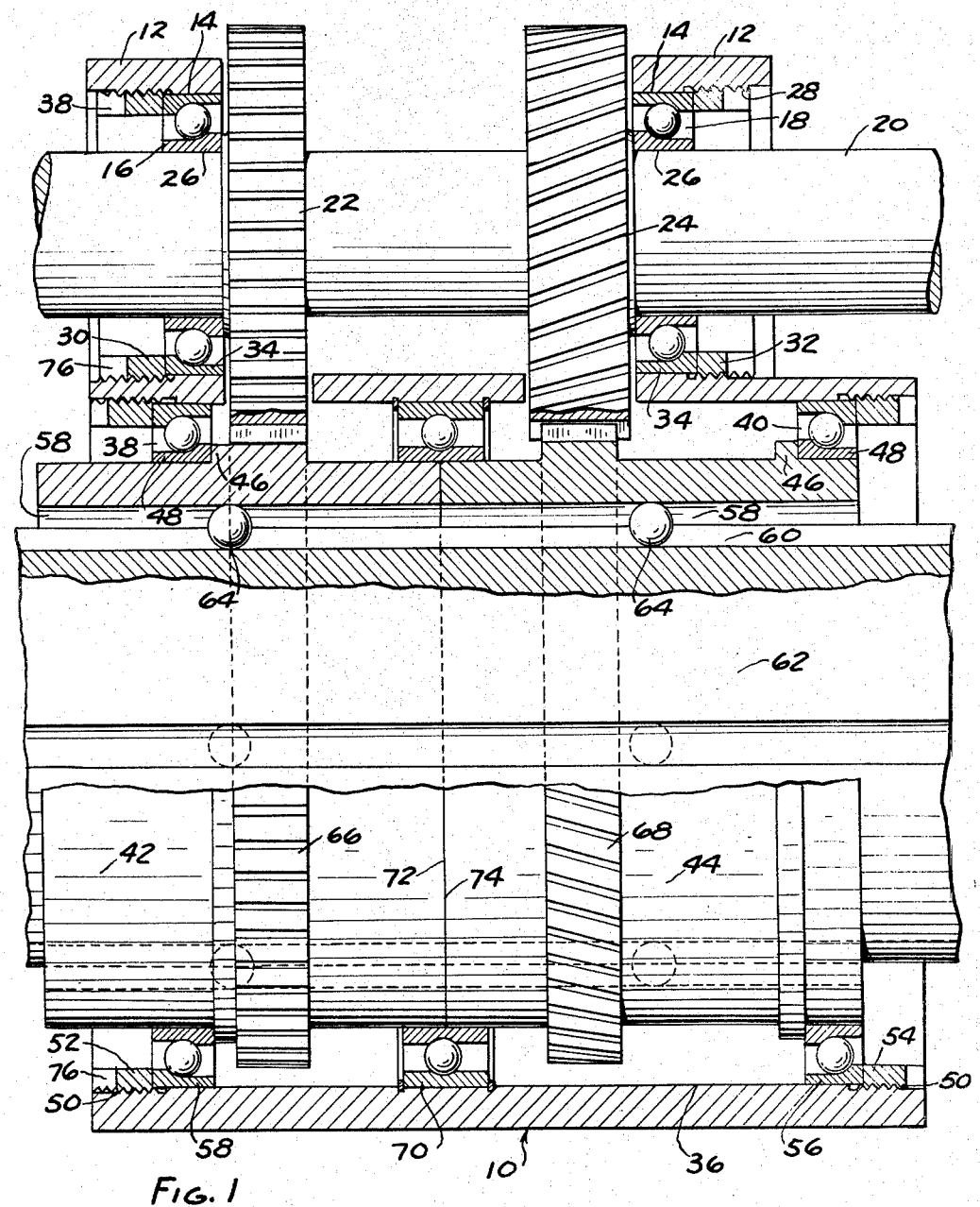
Fig. 1 is a sectional view of a gear driven ball spline assembly incorporating one form of means according to the present invention for eliminating back-lash in the assembly.

Referring particularly to Fig. 1, there is illustrated an arrangement which includes a support generally designated 10 provided with a pair of axially aligned bosses 12. The bosses 12 are bored as at 14 to receive thrust bearings 16 and 18 which journal a drive shaft 20. A pair of gears 22 and 24 are keyed to shaft 20. In the arrangement illustrated in Fig. 1, gear 22 is a straight gear and gear 24 is a helical gear.

The inner races 26 of bearings 16 and 18 abut against the opposed outer faces of gears 22, 24. Each bore 14 is threaded as at 28 to receive threaded adjusting sleeves 30 and 32. Sleeves 30 and 32 are arranged to engage the outer races 34 of bearings 16 and 18.

Support 10 is provided with a second bore 36 in which are arranged thrust bearings 38 and 40. Bearing 38 journals a guide 42 and bearing 40 journals a guide 44. Each of these guides is provided with a shoulder 46 against which the inner races 48 of bearings 38 and 40 engage. Bore 36 is threaded adjacent its opposite ends as at 50 to receive threaded adjusting sleeves 52 and 54. These adjusting sleeves are arranged to engage the outer races 56 of bearings 38 and 40.

Each of the guides 42, 44 are provided with a plurality of internal ball spline grooves 58 which are interengaged with similar ball spline grooves 60 on a driven shaft 62 by means of a series of balls 64 in each guide 42, 44. Conventional means, not illustrated, may be provided for recirculating the balls 64 from one end of the spline grooves 58 in the guides to the other end of the grooves therein. Guide 42 is provided with an external straight gear 66 which meshes with gear 22 on shaft 20 and guide 44 is provided with an external helical gear 68 which meshes with the helical gear 24 on shaft 20. If desired, an additional bearing 70 may be provided for journalling the abutting ends 72, 74 of the guides 42, 44, respectively.

With the above described arrangement, it will be observed that when drive shaft 20 is rotated, driven shaft 62 is correspondingly rotated by reason of the splined connection between shaft 62 and guides 42, 44 and the meshing of gears 22, 66 with gears 24, 68. At the same time, it will be appreciated that the driven shaft 62 on which the head of a machine tool may be mounted is free to slide axially through guides 42, 44.

In the arrangement illustrated in Fig. 1, all back-lash can be eliminated from the ball spline connection as well as at the gear stage and in the thrust bearings in a relatively simple manner. For example, if adjusting sleeve 52 is backed off to the left and adjusting sleeve 54 is tightened so as to advance it towards the right, both guides 42, 44 will be shifted axially to the left and will be relatively angularly displaced by reason of the interengagement of helical gears 24, 68. The relative angular displacement of guides 42, 44 causes a loading of the balls 64 in the respective guides against the spline grooves in the guides and shaft 62. At the same time, gears 66, 68 will be rotated in opposite directions into pressure engagement with the gears 22, 24 so as to eliminate all back-lash in the gear stages. The axial thrust applied to bearings 38, 40 eliminates any back-lash in these thrust bearings as well.

In the arrangement illustrated in Fig. 1, if the ends 72, 74 of the two spline guides 42, 44 are spaced slightly apart rather than in abutting relation as shown, then the back-lash from the assembly, that is, the angular freedom in both the ball spline and the gear, can be eliminated by simply tightening adjusting sleeve 54. The back-lash can also be eliminated by shifting drive shaft 20 axially relative to the two spline guides 42, 44. This can be accomplished by backing off one of the adjusting sleeves 30, 32 and tightening the other. All of these threaded adjusting sleeves are preferably slotted at diametrically opposite sections as at 76 so that they can be readily adjusted by means of a spanner wrench.

Figure 2:
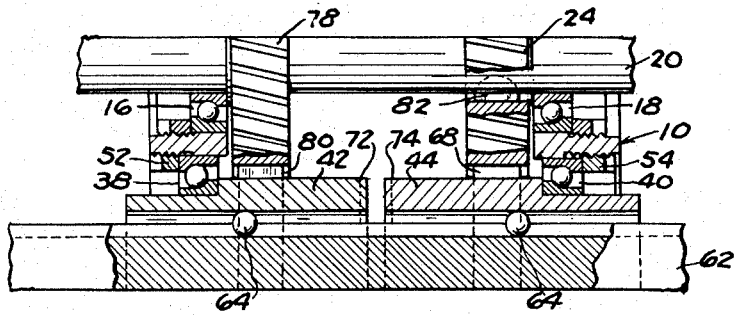
Figs. 2, 3, 4 and 5 are sectional views similar to Fig. 1 and showing different forms of means in accordance with the present invention for eliminating back-lash in a ball spline assembly.

The arrangement shown in Fig. 2 is generally similar to that illustrated in Fig. 1 except that the straight gear 22 on drive shaft 20 has been replaced by a helical gear 78 and the straight gear 66 on guide 42 has been replaced by a helical gear 80. Gears 78 and 24 are of the same hand. In this arrangement, the adjacent ends 72, 74 of spline guides 42, 44 are spaced apart axially a slight amount and back-lash in the assembly is eliminated by shifting either of the spline guides 42, 44 axially towards the other as by the tightening of adjusting sleeves 52 or 54. When one of the spline guides is moved axially towards the other, the helical gears 78 and 24 in mesh with the helical gears 80 and 66, respectively, cause rotation of the two spline guides in opposite directions. This preloads the balls 64 in the two spline guides and at the same time eliminates the back-lash at the gear stage and in the thrust bearings.

Back-lash can be eliminated from the assembly illustrated in Fig. 2 by shifting one of the helical gears 78, 24 axially towards the other. For this purpose, gear 24 is shown slidably keyed to shaft 20 by means of a key 80. Gear 78 can be similarly mounted on shaft 20. Thus, either of the gears can be shifted axially toward the other by tightening sleeves 30, 32 which likewise eliminates all back-lash in the spline connection, at the gear stages and at the thrust bearings.

Figure 3:
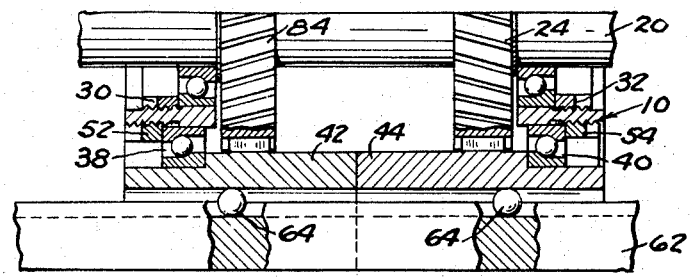

The arrangement illustrated in Fig. 3 is somewhat similar to the previously described arrangements. However, in the drive shown in Fig. 3, both gears 84 and 24 on drive shaft 20 are helical but of the opposite hand. If the adjacent ends 72, 74 of the two spline guides are in abutting relation as illustrated, then back-lash can be eliminated from the ball splines, the gear stages and the thrust bearings by shifting both of the spline guides axially in the same direction as by backing off one of the sleeves 52, 54 and tightening the other sleeve.

Figure 4:
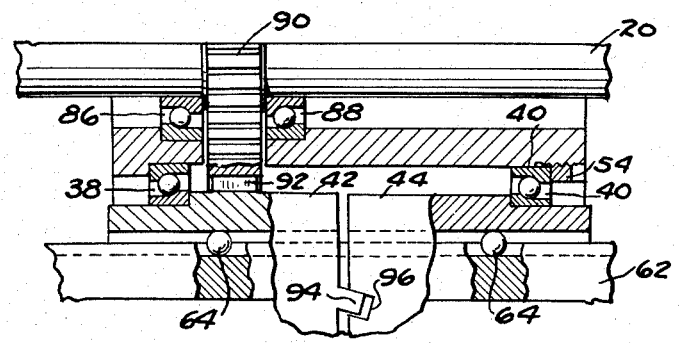

If, in the arrangement illustrated in Fig. 3, the two spline guides 42, 44 are spaced apart slightly, then back-lash can be eliminated from the assembly by simply shifting one of the spline guides axially towards the other. In either case, the gears 84, 24 of opposite hand displace the two spline guides angularly in the opposite direction to eliminate back-lash from the spline connection, the gear stages and the thrust bearings. If desired, back-lash can be eliminated from the arrangement illustrated in Fig. 3 by shifting drive shaft 20 axially relative to the two spline guides 42, 44. In this event, one of the adjusting sleeves 30, 32 would be backed off and the other would be tightened. When the drive shaft 20 is shifted axially relative to the two spline guides 42, 44, the helical gears 84, 24 likewise produce angular displacement of the two spline guides in opposite directions to preload the balls 64, the gear stages and thrust bearings.

Where there is no necessity for eliminating back-lash in the gear stage, an arrangement such as illustrated in Fig. 4 may be employed. In this arrangement, the drive shaft 20 is journalled on support 10 as by axially fixed thrust bearings 86, 88 and has a single gear 90 mounted thereon. In this arrangement, only the spline guide 42 has a gear 92 thereon which meshes with gear 90. The confronting ends 72, 74 of the two spline guides are provided with means for producing relative angular displacement of the guides in response to their relative axial movement. These ends could be telescoped one over the other and interengaged by a helical spline; or, as illustrated, they can be fashioned with interengaging cam projections 94 and cam slots 96 which are designed such that when the two spline guides are moved axially relative to one another, they are angularly displaced in opposite directions.

Thus, in this arrangement, to eliminate back-lash in the splined connection between the spline guides and the driven shaft 62, it is merely necessary to shift spline guide 44 axially toward spline guide 42. This can be accomplished by means of the adjusting sleeve 54 which abuts against the outer race of thrust bearing 40. Thrust bearing 38 need not be axially adjustable.

Figure 5:
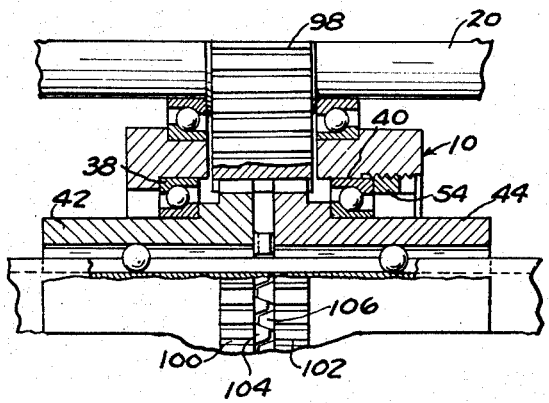

In the arrangement illustrated in Fig. 5, drive shaft 20 has a large straight gear 98 mounted thereon which meshes with two straight gears 100 and 102 which are fixed upon spline guides 42, 44, respectively. The confronting ends of spline guides 42, 44 are fashioned to provide face type gear teeth designed with a sufficient pressure angle to provide relative angular displacement in response to relative axial movement of the two spline guides. Such interengaging cam teeth are illustrated at 104 and 106. In this arrangement, all back-lash can be eliminated from the splined connection between the spline guides 42, 44 and shaft 62 as well as at the gear stage and the thrust bearings by simply shifting one of the spline guides axially relative to the other.

In the arrangement illustrated in Fig. 5, spline guide 42 is axially fixed on support 10 while spline guide 44 is journalled on support 10 by thrust bearing 40 for axial movement by threaded adjustment of sleeve 54. When sleeve 54 is tightened to shift spline guide 44 axially towards spline guide 42, the interengagement of the cam teeth 104 and 106 causes the two spline guides to rotate in opposite directions. The relative angular displacement of the two spline guides loads the balls 64 in the spline grooves of the guides and shaft 62 and at the same time, loads the gear stage. Back-lash in the two thrust bearings 38, 40 is simultaneously eliminated by tightening sleeve 54.

In each of the arrangements illustrated, it will be observed that the two spline guides 42, 44 are designed so that axial shifting movement thereof produces a relative angular displacement of the spline guides. Means are provided for shifting the spline guides axially and the relative angular displacement produced by such shifting movement causes a preloading of the balls in the spline grooves. Depending upon the particular type of gear stage employed for driving shaft 62, axial shifting movement of one or both of the spline guides can be rendered effective for also eliminating all back-lash in the gear stage. In the arrangement illustrated in Fig. 2, one or both of the countershaft gears 24, 78 are shiftable axially of the countershaft whereas in the other illustrated forms of the invention, the countershaft gears must remain fixed on the countershaft both radially and axially.

Thus, it will be seen that I have provided a novel arrangement for eliminating back-lash in ball spline assemblies. The provision of the threaded adjusting sleeves illustrated enables the amount of preloading to be controlled as desired. In most instances, these sleeves would be tightened an amount more than sufficient to just eliminate the back-lash so that the stresses developed would lie in the range of the high rate portion of the deflection curve of the connected members.

I claim:

1. In combination, a drive shaft having gear means fixed thereon, an axially movable shaft parallel to said drive shaft, means forming a rotary driving connection between said shafts comprising ball spline grooves in the axially movable shaft, a pair of guide members on said axially movable shaft, said guide members each having ball spline grooves therein registering with the ball spline grooves in the axially movable shaft, a series of balls interengaging the spline grooves in each guide member with the spline grooves in the axially movable shaft, at least one of said guide members having a gear thereon meshing with the gear means on said drive shaft, and means for displacing one of said guide members angularly with respect to the other guide member.

2. The combination set forth in claim 1 wherein said last mentioned means are actuated in response to relative axial movement of the guide members.

3. The combination set forth in claim 2 wherein said last mentioned means include interengaging cam elements at the axially adjacent ends of the guide members.

4. The combination set forth in claim 2 wherein said last mentioned means include a helical gear on said drive shaft and a helical gear on the other guide member meshing with the helical gear on the drive shaft.

5. The combination set forth in claim 4 wherein the gear means on the drive shaft comprises a straight gear.

6. The combination set forth in claim 4 wherein said gear means on the drive shaft comprises a helical gear of the same hand as the other helical gear on the drive shaft.

7. The combination set forth in claim 4 wherein said gear means on the drive shaft comprises a helical gear of opposite hand relative to the other helical gear on said drive shaft.

8. In combination, a support, a drive shaft journalled on said support, a second shaft, means on said support journalling the second shaft for axial movement along a path parallel to the axis of the drive shaft comprising a pair of annular guide members journalled on said support in axially aligned relation, said second shaft extending axially through said guide members, axially extending ball spline grooves in said guide members and said second shaft, a series of balls interengaging the ball grooves on the guide members with the ball grooves on said second shaft, at least one gear on said drive shaft in mesh with a gear on at least one of the guide members whereby when the drive shaft is rotated, said second shaft, by reason of said ball spline connection, is also rotated, and means responsive to axial movement of at least one of the guide members on said support for producing relative angular displacement of the guide members whereby to eliminate back-lash in the spline connection between said second shaft and said guide members.

9. The combination set forth in claim 8 wherein said guide members are spaced apart axially on said support.

10. The combination set forth in claim 8 wherein said guide members are spaced apart axially on said support and said last mentioned means comprise interengaging cam members at the axially adjacent ends of said guide members.

11. The combination set forth in claim 8 wherein said guide members are spaced apart axially on said support and said last mentioned means comprises a helical gear drive between said drive shaft and the other guide member.

12. The combination set forth in claim 8 wherein both of said guide members are movable axially on said support and said last mentioned means comprises a helical gear drive between said drive shaft and the other guide member.

13. In combination, a support, a drive shaft journalled on said support, said support having a bore therein spaced radially from and parallel to the axis of the drive shaft, a pair of annular guides, a pair of opposed thrust bearings journalling said guides in said bore in axially aligned relation, a second shaft extending axially through said annular guide members, said guide members and said second shaft having radially aligned, axially extending ball spline grooves therein, a series of balls interengaging the spline grooves of each guide member with the spline grooves in said second shaft, one of said thrust bearings being arranged to resist a thrust load on one of said guide members in one direction and the other thrust bearing being arranged to resist a thrust load on the other guide member in the opposite direction, means for axially shifting at least one of said thrust bearings in a direction opposite to its thrust resistance whereby to apply a thrust to its corresponding guide member, means responsive to axial movement of said last mentioned guide member in said last mentioned direction for producing relative axial displacement of the guide members, and means forming a gear drive between said drive shaft and at least one of said guide members.

14. The combination set forth in claim 13 wherein said support is provided with a second bore through which the drive shaft extends axially, a pair of opposed thrust bearings journalling the drive shaft in said second bore, said means responsive to axial movement of said one guide member including a helical gear drive between said last mentioned guide member and the drive shaft.

15. In combination, a support, a pair of bores in said support, the axes of which are parallel and spaced radially apart, a drive shaft extending axially through one of said bores, a pair of opposed thrust bearings journalling said drive shaft in said one bore, a second shaft extending axially through the other bore, a pair of guide members on said second shaft having a ball spline connection therewith, a thrust bearing journalling one of the guide members in said second bore, a thrust bearing opposed to the last mentioned thrust bearing and journalling the other guide member in said bore, means for producing relative axial movement of at least one of said guide members and said second shaft, and means responsive to the relative axial movement of said second shaft and said one guide member for producing angular displacement of one of said guide members relative to the other to an extent such as to load the shaft circumferentially in one direction at one of said guide members and in the opposite direction at the other guide member.

16. The combination set forth in claim 15 wherein said last mentioned means includes a helical gear drive between one of the guide members and the drive shaft and a gear drive between the other guide member and said drive shaft.

17. The combination set forth in claim 16 wherein at least one of the guide members is movable axially on said support.

18. The combination set forth in claim 17 wherein said drive shaft is axially shiftable on said support.

19. In combination, a support, a drive shaft journalled on said support, a second shaft, means on said support journalling the second shaft for axial movement along a path parallel to the axis of the drive shaft comprising a pair of annular guide members journalled on said support in axially aligned relation, said second shaft extending axially through said guide members, axially extending ball spline grooves in said guide members and said second shaft, a series of balls interengaging the ball grooves on the guide members with the ball grooves on said second shaft, at least one gear on said drive shaft in mesh with a gear on at least one of the guide members whereby when the drive shaft is rotated, said second shaft, by reason of said spline connection, is also rotated, means for moving at least one of said guide members axially on said support, and means responsive to axial movement of said last mentioned guide member for producing relative angular displacement of said two guide members.

20. The combination set forth in claim 19 wherein said last mentioned means comprises a member threaded on said support for axial movement thereof, said member having an axial driving connection with said last mentioned guide member.

21. The combination set forth in claim 20 including a pair of opposed thrust bearings journalling said two guide members on said support, said threaded member having a driving connection with the axially movable guide member through one of said thrust bearings.

22. The combination set forth in claim 20 wherein said drive shaft is mounted for axial movement on said support and means for moving said drive shaft axially on said support comprising a member threaded on said support for movement axially thereof and having an axial driving connection with said drive shaft.

23. The combination set forth in claim 22 including a pair of opposed thrust bearings journalling said drive shaft on said support, said last mentioned threaded member having an axial driving connection with said drive shaft through one of said thrust bearings.

References Cited in the file of this patent

UNITED STATES PATENTS

| | | |
|---|---|---|
| 2,386,367 | Taylor | Oct. 9, 1945 |
| 2,397,126 | Buhrendorf | Mar. 26, 1946 |
| 2,620,163 | Stone | Dec. 2, 1952 |
| 2,737,056 | Baumgartner | Mar. 6, 1956 |